United States Patent [19]

Moeller, deceased

[11] 4,087,051
[45] May 2, 1978

[54] COMMINUTING APPARATUS

[76] Inventor: Charles E. Moeller, deceased, late of Blackville NSW, Australia, by Linda Kay Moeller, executrix

[21] Appl. No.: 769,424

[22] Filed: Feb. 17, 1977

Related U.S. Application Data

[63] Continuation-in-part of Ser. No. 638,600, Dec. 8, 1975, abandoned.

[51] Int. Cl.² .............................................. B02C 13/04
[52] U.S. Cl. ........................................ 241/27; 241/55; 241/186.4; 241/190; 241/194
[58] Field of Search ................... 241/27, 30, 55, 101.7, 241/186 R, 186.4, 189 R, 190, 194, 195, 241

[56] References Cited

U.S. PATENT DOCUMENTS

| | | | |
|---|---|---|---|
| 2,650,745 | 9/1953 | Oberwortman | 241/101.7 X |
| 2,810,529 | 10/1957 | Jensen | 241/194 |
| 3,615,059 | 10/1971 | Moeller | 241/186.4 X |
| 3,743,191 | 7/1973 | Anderson | 241/101.7 X |
| 3,912,175 | 10/1975 | Anderson | 241/101.7 X |
| 3,966,128 | 6/1976 | Anderson et al. | 241/101.7 X |
| 4,003,502 | 1/1977 | Barcell | 241/101.7 X |

Primary Examiner—Roy Lake
Assistant Examiner—Howard N. Goldberg

[57] ABSTRACT

A combination tub comminuting apparatus and blower for simplifying and reducing the number of moving parts in a forage comminuting means. The comminuting portion comprises rotor means which rotates on a radius of the tub and is situated in an opening extending from near the edge of the tub to a point which is near the center of the tub. Since the forage is fed to the end of the cylinder described by the rotor rather than to the sides as in normal comminuting means, the length of the cylinder is very short compared to the diameter. The beating means grab the forage and pull it into the enclosure in pieces. Some embodiments of the concept include teeth on the stator enclosure for the rotor to provide further comminution before the rotor executes its final step of forcefully discharging the comminuted forage, via the beating means, in a blower-type action.

7 Claims, 5 Drawing Figures

COMMINUTING APPARATUS

THE INVENTION

This is a continuation-in-part of a copending parent application Ser. No. 638,600 filed Dec. 8, 1975 and now abandoned.

The present invention is concerned generally with tub comminuters or mills by which grasses or other forage materials may be comminuted for convenience in palletizing, storage, drying, or other required treatment and more specifically with a tub mill that uses the same power source and milling mechanism for exhausting the ground feed or forage from the unit after comminuting is complete.

As is known, tub grinders are old in the art. Various types of hammer-mills are also known in the art. The present invention is the first known attempt to combine the two arts in a device, which, when provided with wheels, can be pulled behind a tractor and when using the simple PTO (power takeoff), be used to both mill and blow the comminuted feed to an appropriate repository.

It is, therefore, an object of this invention to provide an improved mill mechanism.

Other objects and advantages of this invention will be apparent from a reading of the attached specification and appended claims taken in conjunction with the drawings wherein:

Figure 1:
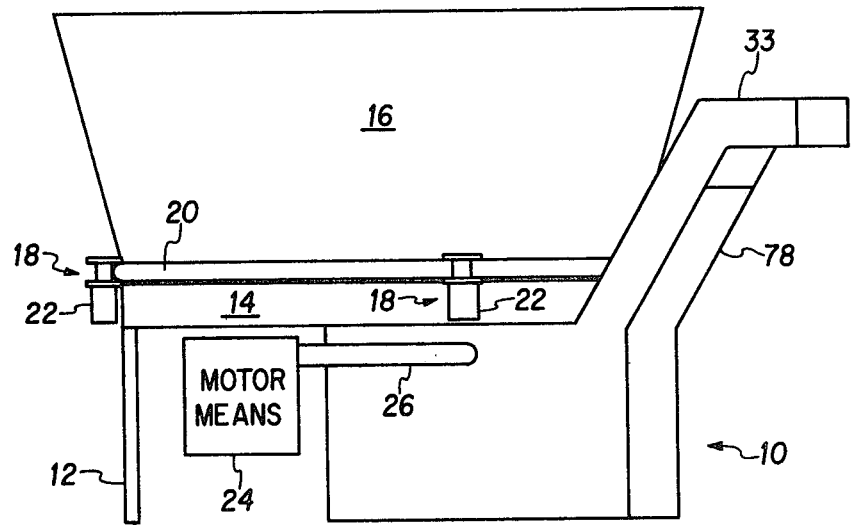
FIG. 1 is an overall side view of the unit.

In FIG. 1, a milling enclosure generally designated as 10, is shown in combination with one or more legs 12 supporting a base means or table 14. An open bottom hopper or tub generally designated as 16 is shown rotably supported above base 14 by a plurality of at least three support rollers 18, only two of which are shown. The separation between 16 and 14 being no greater than that necessary for free rotation of the hopper relative the base 14. The rollers 18 have upper and lower flanges which enclose a flange, bead or rib 20 on the base of tub 16 and prevent vertical movement while allowing rotational movement. The roller 18 may be powered by a motive means 22 which may use any convenient source of power such as electricity or hydraulic pressure. In the alternative, tub 16 may be rotated by the mechanism shown in my U.S. Pat. No. 3,615,059 issued Oct. 26, 1971. The grinding apparatus within the enclosure 10 is driven by a further motor means 24 via a drive shaft 26. Within enclosure 10 is an impeller and paddle or beating means 44, to be later described, which comminutes and throws the forage.

Figure 2:
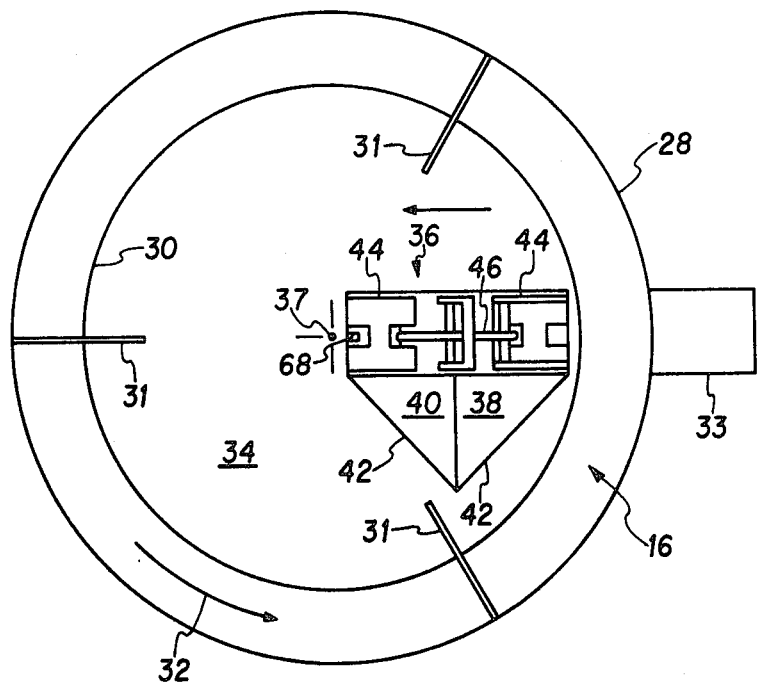
FIG. 2 is a top view of the unit.

The plan view of the mill, as shown in FIG. 2, shows an outer rim 28 and an inner rim 30 of tub 16 with vanes 31 which upon rotation of the hopper in the direction indicated by the arrow 32, tend to sweep forage deposited in the hopper toward an opening 36. Projecting from one side of the mill is an end 33 of a chute or nozzle means 78. The nozzle means 78 may be configured in any one of many different shapes depending upon the direction of discharge and the type of repository. The floor of the tub is the upper surface 34 of base 14. The opening generally designated as 36 is illustrated with adjustable panels 38 and 40 adjacent opening 36. The opening 36 has its maximum dimension extending from the hopper wall toward but not beyond the rotational axis of the hopper indicated as 37. If desired, the opening 36 may have a triangular extension which is normally covered by panels or shutter plates 38 and 40. These panels are hinge mounted along axis 42 for example so that they may be selectively raised into the path of oncoming forage so as to act as a means for selectively varying the quantitites of forage being swept into opening 36. The selective varying or adjustment means (not shown) may be hydraulic or other mechanical convenient means such as an adjustable position screw means. As indicated, the adjustment means is not shown but may comprise a screw operating through a support point to move the plates 38 and 40 in an upward direction to adjust the amount of material which is caught and sheared by beating elements or paddles 44.

Within opening 36 there can be seen a rotor comprising a plurality of paddles 44 attached to a central member or rotating plate 46 by a pair sleeve bearing means 62 and 64 in combination with a central pin or bolt 66 extending through holes 60 in the channel flanges 52 and 54. The central member 46 is directly attached to and driven by shaft 26 in the direction of arrow 67 which coincides with the direction illustrated by the arrow above numeral 36 in FIG. 2. In one embodiment of the invention, the clearance between the paddles 44 and each side of the opening (and enclosure sides) was ⅛ inch.

Figure 3:
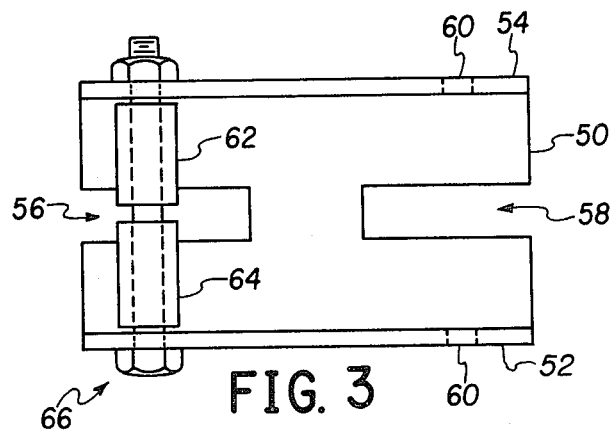
FIG. 3 is a plan view of a paddle or beater element.

The paddle 44 is more clearly shown in FIG. 3 as a channel-shaped member having a bit portion 50 and sides 52 and 54. There are longitudinal slots 56 and 58 appearing in the bit or web portion 50 to provide clearance for free hingability of the beater elements about the pivot mounting bolts 66 and also to provide clearance relative stator milling teeth 68. Two pivot point holes 60 appear in each of the sides 52 and 54 at opposite ends of the hammer 44. As will be noted, the paddle 44 is symmetrical in construction so that it can be reversed in its connection to member 46 when one end is too worn for satisfactory cutting operation.

Figure 4:
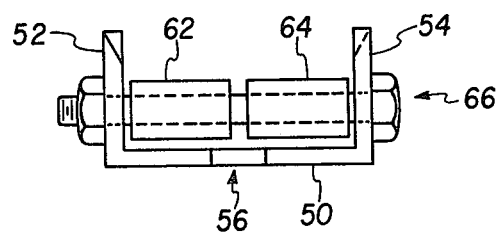
FIG. 4 is an end view of the element of FIG. 3.

FIG. 4 shows an end view of the paddle 44 and uses the same designations as used in FIG. 3 for identical parts.

Figure 5:
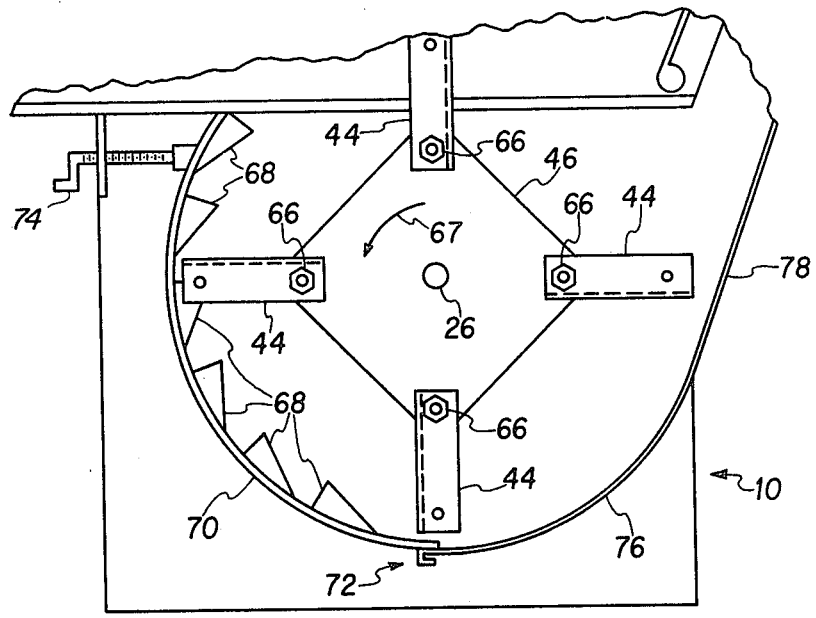
FIG. 5 is a cutaway view of the milling or comminuting portion of the unit.

FIG. 5 is a cutaway view of the enclosure 10 and shows four paddles 44 mounted via pins 66 to central member 46 which is attached to shaft 26. A plurality of teeth 68 are shown attached to a hinged stator comminuting plate 70. The slot 58 of paddle 44 straddles the teeth 68 as the paddle 44 rotates within the enclosure 10. The plate 70 is hinged at point 72 so that it may be adjustably positioned between the walls of the enclosure 10 by adjustment means 74. A further plate 76 is attached to the other end of hinge 72 and forms the base of the discharge means or chute 78 which allows discharge of comminuted material tangential the rotor.

In operation, the tub 16 is filled with forage on a periodic or continual basis. The tub 16 rotates in the direction shown by the arrow 32. The forage is pushed over the feed adjustment plates 38 and 40 into paddle-cutters 44 by vanes 31 and the friction of the hopper sides. The means 44 are sharpened on one edge. This is shown on leg 52 in FIGS. 3 and 4. The sharpened edge is on the extremity of means 44 nearest the adjustable plates 38 and 40. The means 44 cuts the forage as it is pulled or drawn into the enclosure 10 by elements 44. The forage is further shreaded as the paddle means 44 passes by the teeth 68 which enter the opening 58. This combination cutting and shreading action reduces or comminutes the forage to small size pieces. The U-shape of the means 44 forms a cup-like apparatus which then acts to impel or throw the comminuted forage up and out the chute 78.

As previously indicated, the means 74 adjusts the distance between plate 70 and shredding means 44. The distance therebetween determines the size of the average particulate size comminuted forage.

As previously noted, the means 44 is symmetrically constructed so that when the cutting and shredding end becomes worn, the means 44 can be reversed on rotating means 46 and the other end used for the cutting action. For clarity, only one cutting edge has been shown in FIGS. 3 and 4.

In summary, forage is placed in the hopper or tub 16. The tub 16 is rotated by the motor means 22 in combination with the roller supports 18. The rotation of the tub causes rotation of the forage within and the forage is fed to the opening 36 axially of the milling means. The rotating cutting means 44 catches and cuts off sections of it as it reaches a position adjacent opening 36 in the floor and the panel 40. As previously indicated, the plates 38 and 40 are adjustable in the vertical direction so as to adjust the amount of forage cut by each cutting means 44. The forage is cut in sections about the width of the opening 36. The interaction between the toothed stator using teeth 68 and the slot 58 of the means 44 produces further cutting, pulverizing and shredding action so as to further reduce the particulate size of the ground forage. As each means 44 passes by the portion 76 of the enclosure 10, it contains a small amount of ground forage in the U-shaped portion thereof, which amount is subsequently thrown out the chute or discharge means 78 and further directed by end 32.

While I have shown as a preferred embodiment the use of a tub for feeding the forage axially into the comminuting apparatus enclosed within portion 10, this comminuting portion may be used with any other source of forage for feeding the forage axially into the comminuting apparatus.

Further, although the disclosures illustrate a toothed stator in the enclosure 10, this stator may be any rough surface thereby eliminating the requirement for the slots in the paddles if a different type of milling or pulverizing action is required. Thus, the stator used in the milling operation could have teeth or bars or spikes to produce the rough surface necessary for the milling operation. If desired, the bars or other individual elements forming the rough or rasp-like surface on the stator may be movable to alter the particular size rather than moving the entire stator.

While the device has been shown as a combination mill and blower, it will be apparent that the circular housing could be enclosed with an opening in the lower part of 76 so that the milled material will merely fall through. The U-shaped paddle 44 is deemed a preferred embodiment when the device is used as a combination mill and blower, however, with this last mentioned adaptation the paddle 44 could be knife-shaped, flat, round, or in the form of short chains in some embodiments.

Further, apparent modifications to the illustrated embodiment would be providing wheels for portability and further mechanisms for providing the adjustment between the stator and the rotor as well as providing other types of motive functions. Therefore, I wish to be limited only by the scope of the appended claims.

What is claimed is:

1. Cylindrical tub comminuting apparatus for milling forage or the like comprising, in combination:
    circular floor means including a substantially rectangular opening therein, the opening having its longest sides parallel to a radius of said floor, which radius is intermediate said longest sides of said rectangular opening;
    rotating means mounted for rotation on an axis beneath said opening, the top of said rotating means moving parallel to said radius;
    U-shaped beating means having a shearing edge on one side and mounted on said rotating means for rotating therewith about said axis, said beating means extending through said opening to a point above the upper surface of said floor means during rotation of said rotating means;
    means for feeding said forage into said rotating means from the side of said beating means; and
    enclosure means, including outlet means, for enclosing said rotating means including said beating means.

2. Apparatus as claimed in claim 1 for blowing forage after comminution, comprising in addition:
    toothed stator means mounted on an interior surface of said enclosure means adjacent one end of said beating means; and
    said beating means having legs, one of which comprises the sharpened shearing edge, the legs of said U-shaped means straddling said toothed stator means during rotation for comminuting said forage in a shreading action, the beating means acting to throw the forage out said outlet means after comminuting.

3. Apparatus as claimed in claim 1 comprising, in addition:
    means for adjusting spacing between said enclosure means and said beating means for regulating the particular size of forage being comminuted and supplied to said outlet means.

4. In blower miller apparatus of the type comprising swinging paddles mounted on a rotating central portion within an enclosure having an outlet for supplying milled material through said outlet at high velocities, the inventive addition of:
    projection means extending from an interior surface of said enclosure adjacent the travel path of said paddles:
    legs on said paddles juxtaposed and passing to each side of said projection means for coacting therewith during rotation to comminute said forage means;
    sharpened shearing means on an outer edge and side of one of the legs of each of said paddles for cutting material to smaller size before milling;
    means for feeding material to be milled to the end of a cylinder described by the swinging paddles on the side of the swinging paddles having the sharpened leg; and
    means for adjusting the relative distance between said projection means and said paddles by operating to move the side of the enclosure containing said projection means.

5. Cylindrical tub comminuting apparatus for milling forage or the like comprising, in combination:
    circular floor means including a substantially rectangular opening therein, the opening having its longest sides parallel to a radius of said floor, which radius is intermediate said longest sides of said rectangular opening;

rotating means mounted for rotation on an axis beneath said opening, the top of said rotating means moving parallel to said radius;

beating means having a cutting edge on one side and mounted on said rotating means for rotating on said axis therewith, said beating means extending through said opening to a point above the upper surface of said floor means during rotation of said rotating means;

means for axially feeding forage to said cutting edge of said beating means; and enclosure means, including outlet means, for enclosing said rotating means including said beating means.

6. A method of comminuting material in a tub having a single set of paddles one side of which is for cutting and the rotation of which describe a cylinder most of which is in an enclosure comprising the steps of:

feeding material to be comminuted to one end of the cylinder comprising the cutting sides;

cutting the material with the cutting side of said paddle;

pulling the material into the volume defined by rotation of said cylinder;

milling the material within said enclosure; and throwing the milled material from the enclosure with said paddles.

7. A forage mill comprising:

a table having an opening in it;

an open-bottom rotatable hopper floored by said table and so placed in relation thereto that said opening, in the direction of its maximum dimension, extends from the hopper wall towards but not beyond the rotatable axis of the hopper;

means to rotate said hopper and thereby sweep forage placed therein towards said opening; and a mill unit below said opening including a casing furnished with a tangential outlet and also including a rotor in said casing having beater elements which upon rotation of said rotor, intrude through said opening into said hopper and move along said opening towards the centre of said hopper thereby to cause forage in the hopper to be swept into and milled within said casing by said rotor and then flung into said tangential outlet.

* * * * *